Aug. 10, 1954

F. S. MACKLEM 2,686,290

VARIABLE RELUCTANCE TRANSFORMER

Filed Jan. 12 1950

INVENTOR
F. SUTHERLAND MACKLEM
BY
Mitchell Bechert
ATTORNEYS

Patented Aug. 10, 1954

2,686,290

UNITED STATES PATENT OFFICE 2,686,290

VARIABLE RELUCTANCE TRANSFORMER

F. Sutherland Macklem, Freeport, N. Y., assignor to Servo Corporation of America, New Hyde Park, N. Y., a corporation of New York Application January 12, 1950, Serial No. 138,094

7 Claims. (Cl. 323—50)

My invention relates to devices variously known as saturable reactors, transducters, and magnetic amplifiers, for the control of A.-C. power.

In the prior art, control of A.-C. power has been accomplished by means of electronic amplifiers or magnetic amplifiers. Electronic amplifiers have the disadvantage that they require associated D.-C. power supplies which are relatively bulky and expensive to construct. Magnetic amplifiers have the disadvantage that they rely upon saturation of a ferro-magnetic core material and therefore are inherently highly non-linear devices. In particular, they tend to deliver a highly distorted waveform to their load when excited with a sinusoidal input. In addition, the inherent non-linearity of magnetic amplifiers makes them extremely difficult to design for optimum performance. Furthermore, magnetic amplifiers introduce relatively long time delays which in some applications are very serious.

It is, accordingly, an object of the invention to provide an improved device of the character indicated.

It is another object to provide an improved linear amplifying means for controlling the amount of A.-C. power delivered to a load by means of a control circuit which requires relatively little power.

It is also an object to provide an improved magnetic amplifier which may not depend upon magnetic saturation or any of the phemonema associated with saturation.

It is a specific object to provide an improved control means for a two-phase load.

Figure 1:
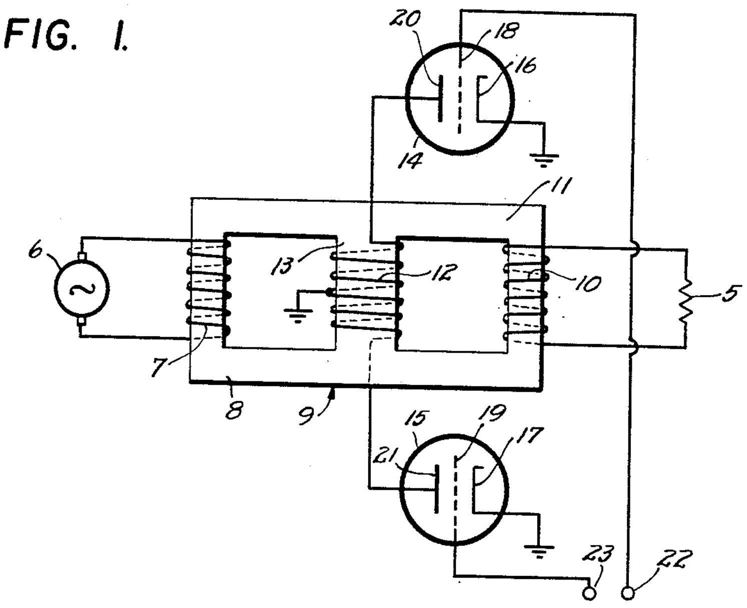
Figure 2:
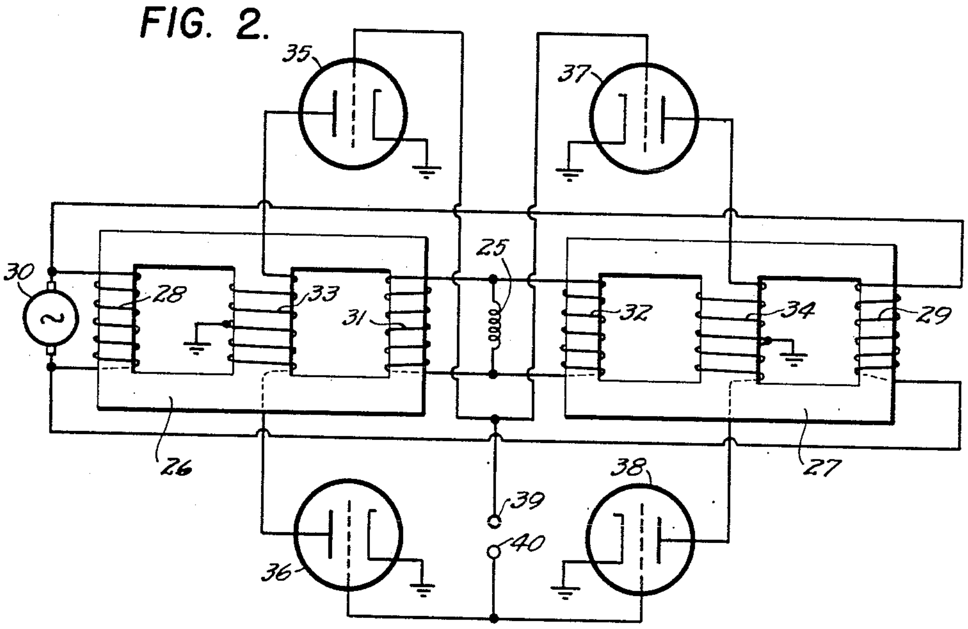

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Fig. 1 is a simplified circuit diagram showing an amplifying device according to the invention; and Fig. 2 is another circuit diagram showing an application of the principles of the invention to the controlled generation of signals for a two-phase load.

Briefly stated, my invention contemplates the use of a conventional transformer core having three legs. A source of alternating current may be applied to a winding on the first leg, and a load may be supplied from a winding on the second leg. Amplification is effected upon varying the reluctance of the third leg, and, for this reason, I have called my device a variable-reluctance amplifier. In the forms which are to be described, I have employed a balanced push-pull arrangement of non-linear resistance elements for control of the tertiary winding and, therefore, of the reluctance of the third leg. In the use of my invention, linear control may be achieved when all transformer legs are operated below saturation.

Referring to Fig. 1 of the drawings, I show my invention in application to a relatively simple circuit for varying the amplitude of alternating-current signals supplied to a load 5. These signals may be derived primarily from a source 6 of alternating voltage (of magnitude less than sufficient to saturate the transformer) and applied directly to a primary winding 7 on one leg 8 of a multiple-leg transformer core 9. Output signals for the load 5 may be taken from a secondary winding 10 on a second leg 11 of the core 9.

Control signals may be applied to a tertiary winding 12 on a third leg 13, and I may employ for this purpose two like non-linear impedances, such as space-discharge devices 14—15, connected in push-pull to opposite ends of tertiary winding 12. The space-discharge devices 14—15 may be three-element vacuum tubes, and I prefer that the input circuits of these tubes be connected in balanced relation with respect to a point on the winding 12 intermediate the ends thereof; in the form shown, both cathodes 16—17 are tied to the center point of tertiary winding 12, through ground. Control signals, which may be of relatively small amplitude compared to the amplitude of alternating current signals from source 6, may be applied across the control means or grids 18—19 of the vacuum tubes; thus, the control function will not involve saturation of the core.

In operation, the application of A.-C. signals to the primary winding 7 sets up a flux in the material of the magnetic core 9. Since the load 5 is connected to the secondary winding 10, any flux which tends to flow through the secondary winding sets up a current in the secondary winding, which current in turn sets up an opposing flux. Consequently, practically all flux normally flows through the shunt path, which, in the form shown, is the middle or third leg 13. The tertiary winding 12 is the means for controlling the reluctance of the shunt path. When the tertiary winding is open, no current can flow in it, and, therefore, no opposing flux is set up in the shunt magnetic path. However, when an impedance is connected across the tertiary winding 12, current can flow, and opposing flux is therefore set up in the shunt magnetic path, so as effectively to increase its reluctance. As the impedance connected across the tertiary winding is reduced, the reluctance of the shunt magnetic path is effectively increased. This causes the flux to flow through the secondary or output leg 11, rather than through the shunt or control leg 13. This in turn sets up a current in the secondary winding 10 and delivers power to the load 5.

The control impedance which is connected across the tertiary winding may be resistive or reactive but, as shown and described, the resistive impedance associated with electronic vacuum tubes may be employed. Since the voltage set up in the tertiary winding is alternating, the anodes 20—21 of the vacuum tubes are driven alternatively positive. If the grids of the tubes are not biased negatively, each tube acts as a shunt on half of the tertiary winding during alternate half-cycles of the alternating voltage. The degree of shunting achieved thereby can be controlled by varying the potential of grids 18—19 with respect to ground, all without saturating the core at any time.

Control of the tubes 14—15 may be variously accomplished. If D.-C. control is desired, the terminals 22—23 for the grids 18—19 will be tied together for a parallel application of direct current to the tubes 14—15 with respect to ground. Alternatively, the control terminals 22—23 may be connected to a source of alternating current balanced with respect to ground. Thus, the amplifier may be either A.-C. or D.-C. controlled.

Fig. 2 illustrates a push-pull variable-reluctance amplifier in a circuit arrangement suitable for supplying a two-phase load, as for controlling the direction and speed of a motor. In the arrangement schematically shown, the single winding 25 represents such a two-phase load, and multi-leg transformer cores 26—27 of the kind described in connection with Fig. 1 may be employed. The flux may be set up in both cores by parallel connection of the two primary windings 28—29 to a suitable source of alternating current 30, the cores being operated below saturation. Both secondary windings 31—32 may be connected across the load 25. The tertiary windings 33—34 may again be balanced with respect to ground, and windings 33—34 may be supplied with control signals from push-pull arrangements of vacuum tubes 35—36, 37—38, respectively. Control signals may be applied in the manner discussed above to the control terminals 39—40. If D.-C. control is desired, the terminals 39—40 may be connected together, and a D.-C. signal applied between ground and all the vacuum-tube control elements in parallel; if A.-C. control is desired, an A.-C. control signal, balanced with respect to ground, may be connected between terminals 39—40, as will be clear.

The direction of turns of the various windings and the connections to these windings are preferably such that the shunting functions achieved by the two tertiary windings 33—34 are out of phase with each other. This may be accomplished by having both primary windings set up fluxes in the same direction in the two cores 26—27, and by having the tertiary windings 33—34 wound in opposite directions; however, in the form shown, I have chosen to have the tertiary windings 33—34 wound in the same direction and to energize the primary windings so as to set up fluxes in opposite directions in the two cores 26—27, as will be clear.

In operation, the reluctance of either one or the other magnetic shunt path is increased when control voltage is applied to the terminals 39—40. The signals in secondary windings 31—32 are always phase-displaced relatively to each other, and the effect of the varied reluctance is to change the amplitude of these phase-displaced signals. Thus, it will be clear that the amplitude of two-phase power delivered to the motor 25 may be controlled by the voltage applied to the terminals 39—40.

It will be appreciated that I have described a relatively simple and compact amplifier utilizing a controlled magnetic coupling. By operating the magnetic-core material always below saturation, linear characteristics may be obtained, and the waveform delivered to the load may be undistorted, when excited with a sinusoidal input. My amplifier is not characterized by long time delays, and audio-frequency responses are completely practical.

While I have described my invention in detail for the preferred forms shown, it will be understood that modifications may be made within the scope of the invention as defined in the appended claims.

I claim:

1. In a variable amplifier of the character indicated, two three-legged transformer cores in each of which one leg is magnetically in shunt with the other legs, primary, secondary, and tertiary windings on the respective legs of each of said cores, means for connecting both primary windings to a source of alternating voltage, means for connecting the secondary windings to a load, and control means for each of said tertiary windings including non-linear impedances connected in push-pull to the opposite ends of each said tertiary winding and in balanced relation with the mid-point of each said tertiary winding.

2. In a variable amplifier of the character indicated, two three-legged transformer cores, primary, secondary, and tertiary windings on the respective legs of each of said cores, means for connecting both primary windings to a source of alternating voltage, means for connecting the secondary windings to a load, and control means including for each said tertiary winding two space-discharge devices, each space-discharge device including an input circuit, an output circuit, and control means; the output circuits of a first two of of said space discharge devices being connected to opposite ends of a first tertiary winding, the output circuits of the second two of said space-discharge devices being connected to opposed ends of the second tertiary winding, the input circuits of one of said first two and of one of said second two said space-discharge devices being interconnected and the input circuits of the remaining two space-discharge devices being interconnected, and means for applying a control signal across said interconnected input circuits.

3. In a variable-reluctance amplifier of the character indicated, two transformer cores each having three legs, primary and secondary and tertiary windings on the legs of said cores, means connecting said primary windings in parallel for excitation by a source of alternating voltage, means connecting said secondary windings for application to a load, a first pair of space-discharge devices connected in push-pull to one tertiary winding, and a second pair of space-discharge devices connected in push-pull to the other tertiary winding, control means for said space-discharge devices, the direction of turns of the primary and tertiary windings on said cores being such that, for excitation of said control means from a single source of control potential, the output of one secondary winding will be phase-displaced from the output of the other secondary winding.

4. In a variable-reluctance amplifier of the character indicated, two transformer cores each having three legs, primary and secondary and tertiary windings on the legs of said cores, means connecting said primary windings in parallel for excitation by a source of alternating voltage, means connecting said secondary windings for application to a load, a first pair of space-discharge devices connected in push-pull to one tertiary winding, and a second pair of space-discharge devices connected in push-pull to the other tertiary winding, each of said space-discharge devices including control means, means interconnecting the control means of one discharge device of each said pair and for separately interconnecting the control means of the other discharge device of each such pair, and means for applying a control potential to said interconnecting means, the polarity of connections to said primary and tertiary windings being such that the output of one secondary winding will be phase-displaced from the output of the other secondary winding.

5. In a variable-reluctance amplifier of the character indicated, two transformer cores each having three legs, primary and secondary and tertiary windings on the legs of said cores, means connecting said primary windings in parallel for excitation by a source of alternating voltage, means connecting said secondary windings for application to a load, a first pair of space-discharge devices connected in push-pull to one tertiary winding, and a second pair of space-discharge devices connected in push-pull to the other tertiary winding, control means for said space-discharge devices; the direction of turns of the primary and tertiary windings on said cores being such that, for excitation of said control means from a single source of control potential, the output of one secondary winding will be phase-displaced from the output of the other secondary winding; the direction of turns of both said tertiary windings being the same, and the connections to and directions of turns of said primary windings being such that flux set up in the primary leg of one core is in the opposite direction to flux set up in the primary leg of the other core.

6. In a variable-reluctance amplifier of the character indicated, a three-legged transformer core, source means creating unsaturated alternating magnetic flux in said core and comprising a primary winding linked to one leg to the exclusion of the other two, whereby said other two legs may be said to constitute separate flux paths in parallel with said first leg, a secondary winding linked to one of said paths to the exclusion of the other of said paths and including output connections for a load, a control winding linking to said other path to the exclusion of said one path, and two amplifiers having output circuits connected in push-pull to said control winding.

7. In a variable-reluctance amplifier of the character indicated, core means comprising two flux-loop paths, source means creating unsaturated alternating magnetic flux in said core means and comprising primary winding means linked to both said paths for circulating alternating flux in both said paths, whereby both said paths may be said to be in parallel with said source, secondary-winding means coupled to one of said paths to the exclusion of the other and including output connections for a load, control-winding means coupled to said other path to the exclusion of said one, and two amplifiers having output circuits connected in push-pull to said control-winding means.

References Cited in the file of this patent

UNITED STATES PATENTS

| Number | Name | Date |
|---|---|---|
| 1,306,525 | Cole | June 10, 1919 |
| 1,390,843 | Thompson | Sept. 13, 1921 |
| 1,783,545 | Peters et al. | Dec. 2, 1930 |
| 1,815,516 | Lee | July 21, 1931 |
| 1,902,466 | Ratkovszky | Mar. 21, 1933 |
| 1,953,519 | Tritschler | Apr. 3, 1934 |
| 1,955,322 | Brown | Apr. 17, 1934 |
| 2,078,688 | Sauer | Apr. 27, 1937 |
| 2,085,060 | Young | June 29, 1937 |
| 2,136,695 | Laing | Nov. 15, 1938 |
| 2,230,558 | Bowen | Feb. 4, 1941 |
| 2,440,984 | Summers | May 4, 1948 |
| 2,444,472 | Schooley | July 6, 1948 |
| 2,445,051 | Wilson | July 13, 1948 |
| 2,450,286 | Livingston | Sept. 28, 1948 |
| 2,486,250 | Bixby | Oct. 25, 1949 |
| 2,568,701 | Arnold | Sept. 25, 1951 |

FOREIGN PATENTS

| Number | Country | Date |
|---|---|---|
| 295,044 | Great Britain | Aug. 3, 1928 |
| 322,199 | Great Britain | Dec. 2, 1929 |
| 661,540 | Germany | June 21, 1938 |